United States Patent [19]
Chilton

[11] 3,752,238
[45] Aug. 14, 1973

[54] SOD PLANTING ATTACHMENT

[76] Inventor: Gustavous W. Chilton, P. O. Box 27, Wartburg, Tenn. 37887

[22] Filed: July 30, 1971

[21] Appl. No.: 167,603

[52] U.S. Cl. .................. 172/180, 172/604, 172/705
[51] Int. Cl. ............................................ A01b 49/02
[58] Field of Search ............... 111/87, 80; 178/604, 178/555, 264, 265, 180, 182, 705, 711

[56] References Cited
UNITED STATES PATENTS

| | | | |
|---|---|---|---|
| 3,122,111 | 2/1964 | Taylor, Sr. | 172/604 X |
| 2,906,353 | 9/1959 | Rogers | 172/265 |
| 3,237,577 | 3/1966 | Wilkins | 172/604 X |
| 3,589,448 | 6/1971 | Gay | 172/264 X |

FOREIGN PATENTS OR APPLICATIONS

| | | | |
|---|---|---|---|
| 69,664 | 3/1961 | India | 172/265 |

*Primary Examiner*—Robert E. Pulfrey
*Assistant Examiner*—Stephen C. Pellegrino
*Attorney*—Martin J. Skinner

[57] ABSTRACT

An attachment for conventional seed planters which permits the planting of crop seed in sodded areas which may have been undisturbed for as many as 20 years. The attachment is self-drafting; that is, no load weight must be applied to bring about proper ground preparation. The essential components are a semi-rigid curved foot immediately following a fluted disk colter. These are supported below a frame which has provisions for adjusting row width and has connections for standard three-point tractor hitches and corresponding attaching points on a seed planter unit.

1 Claim, 3 Drawing Figures

Patented Aug. 14, 1973

INVENTOR.
Gustavous W. Chilton
BY Martin Skinner
AGENT.

INVENTOR.
Gustavous W. Chilton

SOD PLANTING ATTACHMENT

BACKGROUND OF THE INVENTION

One of the current conservation-type modifications in agriculture today is known as sod planting. Rather than plow, disk and then plant a field, which often results in considerable erosion, loss of fertilizer, etc., planting is done in fields which were originally pasture or other crop fields on which there is a sod covering. The sod is opened in narrow strips by one of several machines, fertilizer and seed are deposited and then covered. The ground may be treated with a herbicide either before or after planting. Although sod planting is not a new technique, very little use has been made of it until the development of suitable herbicides. Actually, the grasses and other sod components need not be killed entirely, but only held in a dormant state for the duration of the new crop. For corn and similar crops, this may be about 3 months.

Because of the increased utilization of sod planting, manufacturers of farm equipment have built and marketed many forms of sod planting devices. One such device is the Bridger "flexible minimum tillage" sod planter marketed by Ford Motor Co., Tractor and Implement Division. This device utilizes a downward projecting flat spring-like member preceding a conventional "runner opener" of a planter. In another design, a fluted disk colter is used to break the ground in front of the runner opener of the planter. In still another design, an offset fluted disk colter and a regular dished disk are used in combination to prepare the ground in front of the planter foot. These later two devices are described in Agronomy Journal, Vol. 56, p. 211-214 (1964).

While all of the known prior art sod planting devices are suitable for soft ground, none have been found to be completely acceptable in hard, compacted soil referred to as tight soil. No presently available units are suitable for planting in ground where, for example, pulpwood trees have been cut. In the tight ground, a large amount of weight must be added to the top of the prior art planter attachments to give adequate draft (soil penetration). As much as several hundred pounds, in the form of water barrels, etc., are often needed in extreme soils. This, of necessity, requires the use of large tractors. Accordingly, this type of planting cannot be practiced by a farmer with small acreage and/or small tractors. Added weights also create balance problems when planting in hilly terrain.

SUMMARY OF THE INVENTION

The disadvantages of the prior art are overcome by my attachment which precedes a conventional seed planter unit to open the ground and is self-drafting; that is, adequately penetrates the ground without the application of weights to the planter. This is accomplished by using, in combination, a fluted disk colter and a following in-line forwardly curved foot which is provided with limited resiliency to move in a rearward direction. The path loosened by the flutes of the colter must be of the order of one and one-half inches or larger to be effective, and the lower tip of the foot unit must extend below the depth of the colter. One disk colter-curved foot unit is provided for each planter dispenser and is in line therewith.

DETAILED DESCRIPTION

Figure 1:
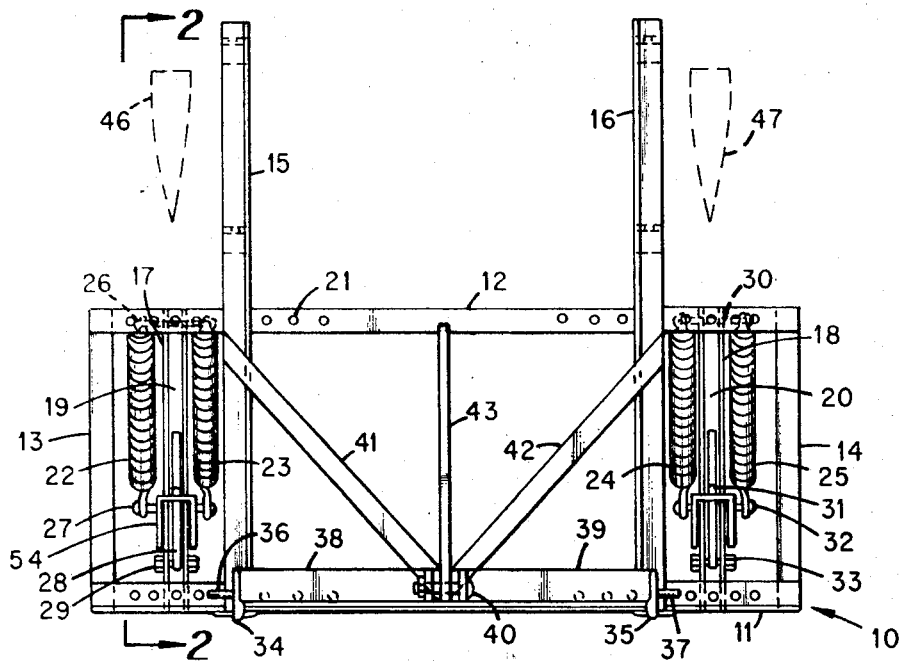
FIG. 1 is a top view of a sod planter attachment illustrating primarily the mounting support for the components for successful sod planting.
Figure 2:
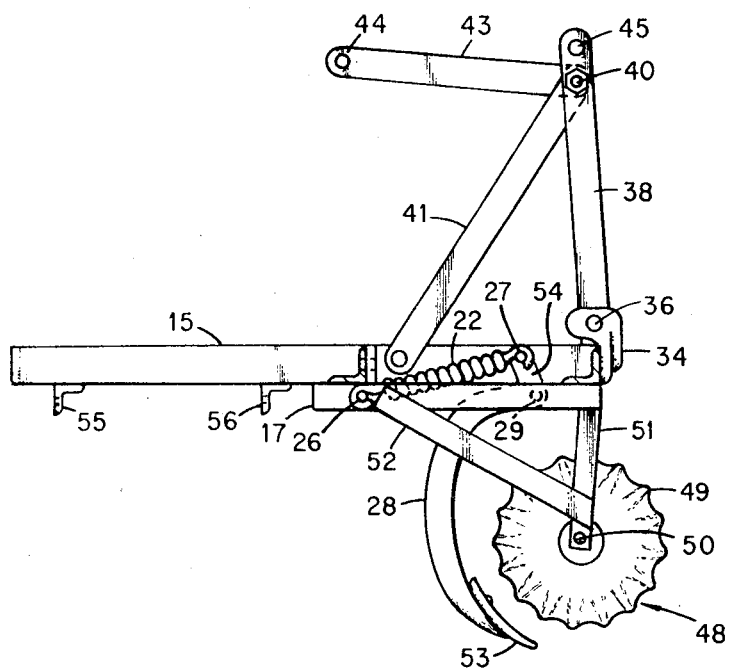
FIG. 2 is a side sectional view, taken at 2—2 of FIG. 1 illustrating the principal components of the subject device.

My sod planting attachment is illustrated most clearly in FIGS. 1 and 2. Referring first to FIG. 1, a frame or platform 10 and associated supporting and attaching members are shown. The frame 10 comprises a forward bar 11, a rearward bar 12 and end bars 13, 14. These are joined as by welding or bolting. Releasably connected to bars 11 and 12, and extending rearwardly of bar 12, are a pair of arms 15, 16 to provide part of the connecting mechanism to a conventional seed planter (not shown). The spacing between arms 15, 16 is established by the particular structure of the specific planter unit. Also releasably connected between bars 11 and 12 are a pair of open channel members 17, 18, each of which are provided with a slot 19, 20 along most of their length, the purpose of which will be described hereinafter. The spacing between channel members 17 and 18 may be set for a desired spacing between rows of crops by selecting corresponding fastening holes 21 in bars 11, 12. The spacing of arms 15, 16 are similarly set through use of proper holes 21.

Positioned on each side of channel members 17, 18 are coil springs 22, 23, 24, 25. One end of springs 22, 23 are connected to channel members 17 at its rearward end by a pin 26 (see FIG. 2). The forward end of springs 22, 23 are attached to a pin 27 which passes through an extension 54 to a foot member 28 (to be described in more detail hereinafter). Foot 28 is pivotally fastened in channel member 17 with pin 29. Springs 24, 25 are fastened to channel member 18 with pin 30 and to foot 31 with pin 32. Foot 31 is pivoted in channel member 18 with pin 33.

Other elements shown in this FIG. 1, which are more clearly shown in the other figures, are a pair of mounting brackets 34, 35 each having a pin 36, 37 for connecting to a portion of a conventional hitch on a tractor or other towing vehicle (not shown). Pins 36, 37 also fasten the lower end of angular brace units 38, 39 which join with bolt 40. A second pair of angular braces 41, 42 are attached to arms 15, 16 near bar 12 and rise to join braces 38, 39 at bolt 40. A rearwardly extending arm 43 similarly is joined to this combination of braces at bolt 40. Arm 43 is provided with a hole 44 (see FIG. 2) at the rearward end so as to be attached to a corresponding connecting point on a conventional seed planter (not shown). Braces 38, 39 extend above bolt 40 and are each provided with matching holes 45 (see FIG. 2) for the attachment to the third point of a conventional three-point tractor hitch. For clarity of understanding the operation of my planter attachment, the position of opener runners 46, 47 of a conventional seed planter is shown as being aligned directly behind foot members 28, 31.

Referring now to FIG. 2, which is primarily a side view of my device, with a section taken at 2—2 of FIG. 1, most of the above-described components are shown.

The spacial relationship of bracket 34, braces 38, 41, pin 36, bolt 40, arm 43 and holes 44, 45 are particularly visible. This figure also shows the essential components of my development: the above-mentioned foot 28 and a fluted disk colter 48. The colter 48 is a commercial element manufactured, for example, by Electric Forge and Co., Birmingham, Ala. Although several sizes (diameters) are available, a sixteen inch unit is used as a practical component of my sod planter attachment. The disk colter is formed with flutes 49 alternately protruding to opposite sides of the disk. Although many sized flutes are available, for the satisfactory operation of my invention the flutes must extend at least three-fourths inch to each side giving an effective thickness of about one and one-half inch. Flutes could exceed that amount and perform satisfactorily. The colter 48 is mounted on an axle 50 which, in turn, is positioned by braces 51, 52 which depend from frame 10. The angle of brace 52 is not critical; however, it may be desirable for brace 51 to slant backward slightly at the axle end thereof to reduce accumulation of trash such as prior crop stubble, etc.

The aforementioned foot 28 is generally arcuate in shape with the lower portion having a forward-pointing circular curvature with the center being approximately the colter axle 50. To the lower portion of the foot 28 is releasably attached a narrow pointed pad 53 such as is known as an "alafalfa point" in the trade. Such an element is about 6 inches long and about 1 inch wide; both ends are pointed. However, any similar pad would be effective. The combined length of foot 28 and pad 53 is such as to place the lower extremity of pad 53 lower than the bottom of colter 48 when in use. The shape of the upper portion of foot 28 is not particularly important except that it is provided to receive pivot pin 29. An extension arm 54 is attached to foot 28 above pivot pin 29 to which is attached one end of spring 22 by pin 27, as described above.

This particular structure of the foot and spring components associated therewith may be obtained as a unit from manufacturers such as Pittsburgh Steel Co., Pittsburgh, Penna. In other applications, this unit is used on field cultivators. In my planting attachment, it is the element that provides the self-drafting characteristic when combined with the colter 48. The spring 22 gives rise to a chattering action (slight backward and forward vibration) of foot 28 when in tight soil and enhances operation of the device. Furthermore, the spring 22 (and spring 23) permits the foot 28 to tilt backward when an obstacle is encountered, the foot 28 moving back along the aforementioned slot 19 in channel member 17. Also shown in this figure are a pair of brackets 55, 56 on extension arm 15 for connection to the frame of a seed planter unit (not shown).

Figure 3:
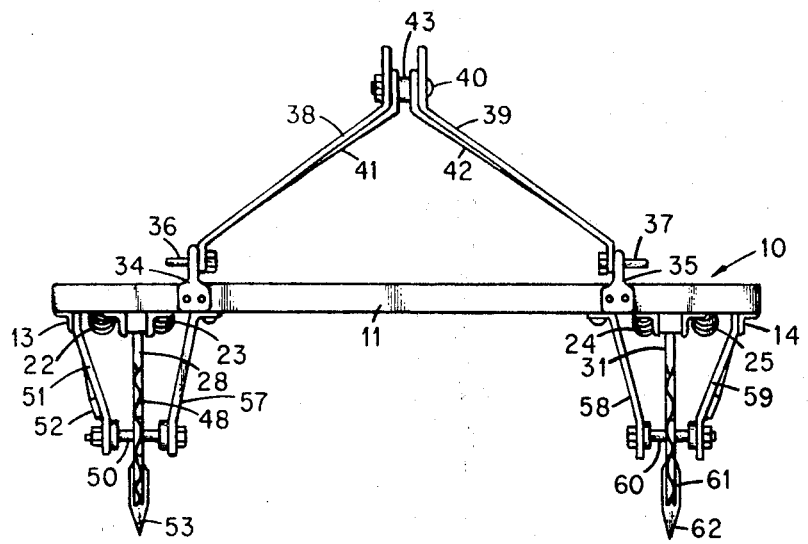
FIG. 3 is a front view of the subject of sod planter attachment.

FIG. 3 shows the front of my sod planter attachment which further illustrates the shape of braces 38, 39, 41 and 42. Also, a second upward brace 57 of axle 50 is shown which attaches to frame 10. Furthermore, braces 58, 59 are shown for a second axle 60 upon which is mounted a second fluted disk colter 61 in front of the second foot 31. A pad 62 is shown attached to foot 31.

The frame 10 and other various support members described above, although being an expendient manner of mounting the necessary foot and fluted disk colter units, is not to be construed as a limiting construction. For example, a unitary frame for the platform having integral strengthening and attaching elements could be substituted for that shown and described. Further, a single foot-colter combination might be attached to the frame; or more than the two shown could be used. Similarly, other linkages for the foot which provide the same function might be substituted at the top of foot members 28, 31. Although springs are used in the commercially available subunit of my device, other resilient elements such as torsion bars might similarly be employed.

As stated above, the controlling features for proper performance are the specifications on the inline colter and foot member design and their interrelationship. The subject sod planter attachment may then be used with any commercial seed planter such as Model 309 manufactured by Ford Motor Co., Tractor and Implement Division. It may be used with any tractor or other towing vehicle having a standard three-point hitch, and standard modification could be made for any other hitch construction.

In a normal use of this sod planter attachment, a conventional seed planter is affixed to bar 43 at hole 44 and to arms 15, 16 with brackets 55 and 56. The pins 36, 37 and braces 38, 39 of the attachment are then coupled to a conventional three-point hitch on a tractor. Through use of a hitch lift on the tractor, the colters and foot members, as well as the openers of a seed planter, are elevated above the ground so that the unit may be transported to a given field where sod planting is to be accomplished. Alternatively, the seed planter may be provided with wheels that may be used to raise the colters, foot members and openers above the ground.

When the beginning point for sod planting is reached, the colters, foot members and openers are lowered. Forward movement of the tractor draws the foot members into the ground with a result that the colters enter the ground also to break a pathway in the sod of about 1 and ½ inch wide ahead of the foot members. With the foot members providing draft into the ground, and with the combined colters and foot members preparing the soil, the runner openers of the planter open a proper furrow for depositing seed and/or fertilizer at the desired depth. This furrow is then closed in a normal manner. A herbicide spreader may be attached behind the seed planter to apply herbicide to the total surface of the ground to retard sod growth during crop growth.

If desired, two or three of the subject sod planter attachments may be drawn in side-by-side relationship by a single tractor to plant up to six rows of a crop. Each unit operates independently so as to accommodate planting on uneven ground. A single unit has been demonstrated to produce proper sod planting with no additional weight with tractors having as little as 22 drawbar horsepower. Thus, the attachment may be used by farmers having only small acreage and who use small tractors. This is not possible with any of the known sod planters when used in tight soils encountered in many areas.

I claim:

1. A towed implement to be rigidly attached to the leading portion of a sod planter to prepare soil for the acceptance of seed and to draw an opener-runner of the planter into the sod a desired depth, which comprises:

a frame substantially parallel to the ground having a leading edge and a trailing edge and being provided with means at the leading edge for releasably connecting the implement to a towing vehicle and at the trailing edge for releasably and rigidly connecting the implement to the sod planter;

at least one ground engaging unit supported by the frame, comprising: a rotatable disk colter having radially-extending flutes alternately projecting at least three-fourths inch on each side of the disk colter; means attached to the frame for mounting the disk colter in a vertical plane below and perpendicular to the leading edge of the frame; a pivot member attached to the frame; a rigid foot supported on the pivot member in alignment with and rearward of the disk colter, the foot having an upper portion above the pivot member and a lower portion below the pivot member extending a greater distance below the frame than the disk colter and being curved forwardly in a substantially circular arc; a pointed pad attached to the extremity of the lower portion of the foot, the width of the pad being less than twice the projection dimension of each flute of the disk colter; and resilient means connected between the extremity of the upper portion of the foot and a rearward portion of the frame; and means on the frame for adjusting the ground engaging unit to a position whereby the foot and colter of the ground engaging unit are in alignment with the opener-runner of the planter.

* * * * *